United States Patent [19]

Burns et al.

[11] Patent Number: 5,218,284
[45] Date of Patent: Jun. 8, 1993

[54] INTEGRAL BATTERY CHARGING AND SUPPLY REGULATION CIRCUIT

[75] Inventors: Arthur G. Burns, Plantation; Robert E. Stengel, Ft. Lauderdale, both of Fla.

[73] Assignee: Motorola, Inc., Schaumburg, Ill.

[21] Appl. No.: 636,480

[22] Filed: Dec. 31, 1990

[51] Int. Cl.$^5$ .............................................. H02J 7/04
[52] U.S. Cl. ......................................... 320/14; 320/9
[58] Field of Search ............................ 320/5, 9, 14, 21

[56] References Cited

U.S. PATENT DOCUMENTS

| | | | |
|---|---|---|---|
| 3,417,307 | 12/1968 | Kosa et al. | 320/9 |
| 3,673,485 | 6/1972 | Vital et al. | 320/5 X |
| 3,771,039 | 11/1973 | Stewart | 320/21 X |
| 3,800,207 | 3/1974 | Kott | 320/9 X |
| 3,867,950 | 2/1975 | Fischell | 128/419 P |
| 4,006,396 | 2/1977 | Bogut | 320/2 |
| 4,223,232 | 9/1980 | Bulat | 320/9 X |
| 4,792,903 | 12/1988 | Peck et al. | 364/425 |
| 4,974,118 | 11/1990 | Rounds | 361/311 |

FOREIGN PATENT DOCUMENTS 1196683 11/1985 Canada .................................. 319/73

OTHER PUBLICATIONS

Pp. 8-61 of the 3rd Edition of the Electronics Engineers' Handbook (1989) edited by Donald G. Fink and Donald Cristiansen discusses Switching Regulators.
Pp. 95-110 of Motorola's Linear/Switchmode Voltage Regulator Handbook (1989).

Primary Examiner—Steven L. Stephan
Assistant Examiner—Kristine Peckman
Attorney, Agent, or Firm—Pablo Meles; Lesley Ann Rhyne

[57] ABSTRACT

A rechargeable battery (10) comprises at least one cell (7) having a positive and a negative terminal. Switching regulation circuitry (9) coupled to the cell (7) is selectively used for regulating the battery output (28) and for regulating the charging (12) of the battery.

15 Claims, 2 Drawing Sheets

INTEGRAL BATTERY CHARGING AND SUPPLY REGULATION CIRCUIT

TECHNICAL FIELD

This invention relates generally to batteries and chargers, and more specifically to a circuit within a rechargeable battery pack or system that provides both load regulation to a battery operated unit and recharging regulation from a charger to a battery.

BACKGROUND

Portable products using rechargeable batteries have their voltage regulated commonly by a linear regulator. Likewise, a charger applying a rate of charge to a battery typically has means of regulating the current to the battery. Regulating the energy provided to the load from a rechargeable battery and separately regulating the energy provided to a rechargeable battery is an inefficient system using a redundancy of circuitry. A need exists to eliminate this redundancy by supplying one circuit for both functions.

Battery packs for portable products are typically available in a variety of capacities and in a variety of battery cell chemistries. A battery charger generally cannot determine the charge capacity and battery cell chemistry inexpensively. U.S. Pat. No. 4,006,396 by Bogut discusses an inexpensive universal battery charging scheme which provides an electrical element within the battery pack having a characteristic related to a predetermined charging rate of the battery. The corresponding charger has a sensing circuit that recognizes the characteristic electrical element and thus provides the optimum charging rate for the corresponding battery capacity. This charging scheme as well as other common battery charging schemes requires that the charger sense the type of battery that is being charged. The sensing circuits within chargers increases the cost of the chargers and are typically limited in distinguishing between cell chemistries. Thus, a need exists for circuitry within a battery pack or system that would allow an optimum charging rate to the battery without external battery capacity and chemistry identification sensing.

The means for regulating charger current to a rechargeable battery is typically located within the charger. Likewise, a battery operated unit (such as a two-way radio) retains the means for regulating the energy from the battery to the battery operated unit. In both instances, the battery itself fails to retain the interfacing regulation circuitry. Typically, less efficient linear down regulators are used instead of the more efficient switching regulators in order to prevent electromagnetic interference (EMI). Although, switching regulators are more efficient, the shielding required within a radio or battery operated device sensitive to EMI would add greater expense, size, and complexity to the battery operated device. On the other hand, linear regulators create heat when functioning as current limiting devices. Thus, a need exists for circuitry within a battery pack that not only optimizes the charging rate to the battery, but also regulates energy to a load such as a battery operated device while overcoming the deficiencies of EMI and heat generation.

SUMMARY OF THE INVENTION

Accordingly, a rechargeable battery in accordance with the present invention comprises at least one cell having a positive and a negative terminal. The battery further comprises switching regulation circuitry coupled to the one or more cells for both selectively regulating the battery output and for regulating the charging of the battery.

DETAILED DESCRIPTION OF THE PREFERRED EMBODIMENT

Figure 1:
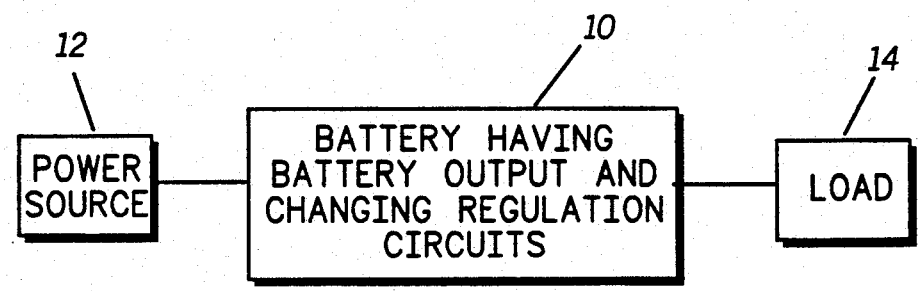
FIG. 1 is a simplified block diagram of an integral switching battery charging and supply regulation circuit in accordance with the present invention.

Referring to FIG. 1, there is shown a block diagram of battery 10 having switching regulation circuitry for selectively regulating the battery pack or system output to a load 14 and for regulating the charging energy from a power source (12) of the battery pack 10. The battery pack 10 is preferably a rechargeable battery having at least one cell. Within the battery housing (not shown), switching regulators regulate the output of the battery pack 10 to a load 14 such as a two-way portable radio or any portable electronic product. The switching regulators within the battery pack 10 also regulate the recharging energy provided by the power source 12 to the battery pack 10.

Figure 2:
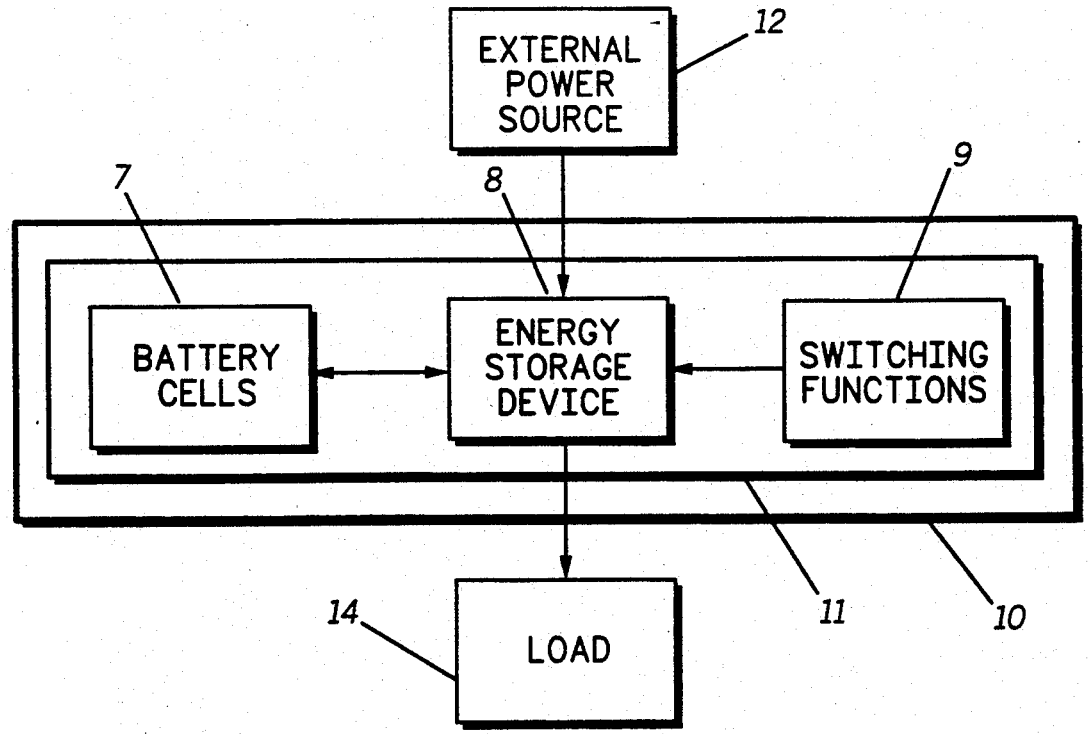
FIG. 2 is another simplified block diagram of an integral switching battery charging and supply regulation circuit in accordance with the present invention.

Referring to FIG. 2, there is shown another block diagram of the present invention further detailing the battery pack or system 10 having battery output and charging regulation circuits. Battery 10 of FIG. 1 comprises battery pack cells 7, an energy storage device 8 and a switching function means 9. Optionally, a shielding means 11 could be used around or about the battery pack 10 to prevent the Electromagnetic Interference from the switching function means 9 from interfering with the load and/or external power source operations (12 and 14). Alternatively, the shielding means 11 can serve as an absorbing means for converting electromagnetic energy into noninterfering energy and even further function as a battery housing.

Figure 3:
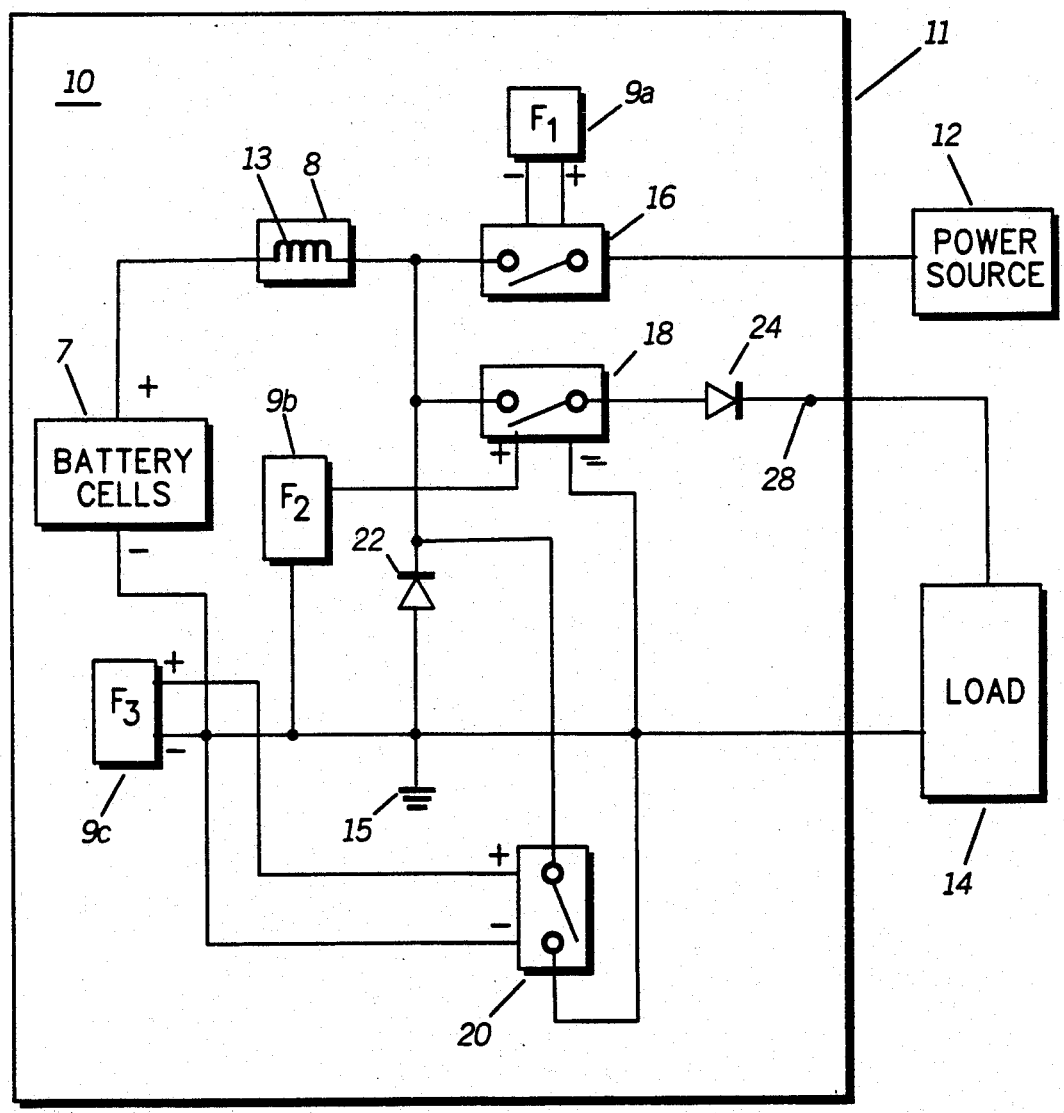
FIG. 3 schematic diagram of a switching battery charger and voltage regulator in accordance with the present invention.

Referring to FIG. 3, there is shown a battery pack 10 with an external power source 12 and an external load 14. The circuit in battery pack 10 performs the function of regulating the charging of cells 7 from a power source 12 (typically, a rectified battery charger source) and further performs the voltage regulation from the cells 7 to the load 14. In this embodiment, the power source 12 is preferably a direct current voltage source coupled to ground (15). The load in this embodiment is typically a parallel load comprising of a resistive and capacitive elements. The present invention is ideal for use with portable battery operated communication products such as two-way radios.

The battery pack 10 preferably comprises a series of interconnected cells 7 having a positive and a negative terminal. The positive terminal is coupled to an energy storage device 8 which preferably can be either an inductor or a capacitor. The use of Supercapacitors as described in Canadian Patent 1,196,683 by Dwight Craig would be particularly suitable for the present invention. In this instance, an inductor 13 is coupled to the positive terminal and used as the storage device. Switching function circuit 9a couples to switch 16 which inturn couples to the inductor 13. Switching function 9b couples to switch 18 for coupling the load 14 through diode 24 to energy storage elements 8 and 7. (Battery Cells can serve as energy storage elements). During the charging of battery cell(s) 7 by power source 12, switch 18 disconnects the load 14. Switching Function circuit 9c couples to the negative terminal of cell(s) 7 and further drives switch 20. Diodes 22 and 24 are used to bias the current in the appropriate charging and supply paths. Diode 22 is primarily used during the charging cycle while diode 24 is primarily used to prevent discharge from the load 14 back into the battery pack 10. Diode 22 is coupled between ground (15) and the energy storage device 8. Diode 24 is coupled between switch 18 and the input to the load 14 or node 28.

The DC to DC conversions of the battery charging and voltage regulation are accomplished with switching functions F1 (9a), F2 (9b), F(9c) and the associated charging function switches 16, 18, and 20. The energy storage device 8 is common to both the DC to DC switching conversion circuits which preferably can be time domain multiplexed. Power source 12 is down converted to charge the lower voltage of the battery cells 7.

Operationally, the cells 7 are charged when the charging function switches 18 and 20 are open and function switch 16 is switching. When function switch 16 is closed, energy is transferred form DC source 12 to the battery cells 7 and the fields of the induction (13). When switch 16 is opened, the remaining energy in the inductor field is stored in the battery cells 7 through the loop comprising of the battery cells 7, the inductor 13, and diode 22. The rate of the battery charging of the cells 7 is set by the "on to off" time of the function switch 16, the voltage of DC source 12, and the inductance of inductor 13.

With the function switch 18 closed, function switch 16 open, and function switch 20 switched with the function F3 (9c), the battery cell 7 voltage is up converted and regulated at node 28. When switch 20 is closed, energy from battery cells 7 is stored in the inductor fields (13). After switch 20 is opened, the field energy in the inductor 13 is delivered to the load 14. The voltage at node 28 is monitored and used to adjust the switching function F3 (9c). This provides a constant voltage at node 28 with a varying load 14 (in terms of resistance, capacitance, or inductance). Of course, once again, a shield 11, can be optionally used to isolate EMI from the power source 12 and more importantly from a EMI sensitive load 14, such as a two-way radio. Providing shielding in the battery housing instead of a two-way radio housing allows for an optimum method of reducing or eliminating EMI to the radio from the switch regulation.

An alternative embodiment of the present invention using a capacitor as a storage device instead of an inductor 13 as shown in FIG. 3 is also within contemplation of the present invention. Although, using capacitors may require a different switching arrangement, the concept as explained for FIG. 1 remains the same. Operationally, functions F1, F2, and F3 could provide the appropriate timing, multiplexing, or switching as required and as known in the art. Since capacitors have a faster discharge voltage reduction rate than typical batteries when supplying a load, the switch regulation can be used to simulate the discharge voltage of a battery such as a NiCad battery. For single capacitors with a lower operating voltage than required for use with many portable products, switching arrangements could be used to rectify this problem. For instance, several capacitors could be used to achieve or surpass the minimum operating voltage for the load. The capacitors could be charged in parallel, and switched to a series arrangement to provide the required voltage to the load.

The use of Supercapacitors would be ideal for use with the switching regulation functions disclosed in the present invention. Since capacitors in general discharge voltage at a faster rate than a typical NiCad battery discharge rate profile and usually do not provide sufficient sustainable voltage, the use of switching regulation functions could be used to simulate a NiCad battery discharge rate. In conjunction with Supercapacitors, (which provide the required voltage (or greater) to operate loads such as two-way radios at full charge, but fail to sustain the minimum operating voltage for an appreciable time after discharging commences), the use of switch regulators can prolong the time the capacitor voltage remains above the minimum operating voltage to approximately simulate the discharge profile of a typical NiCad battery or other cell chemistry battery within operating limits. Thus, the load can be conceivably operated by the capacitor without the use of the cells after the cells or the power source charges the capacitor. In other words, cells can serve as the charging energy source to the capacitor (until cells are depleted or discharged), whereby the load would operate from the energy provided by the switch regulated capacitor. On the other hand, the load could still be operated by the energy from the cells and the cells could be continuously or intermittently recharged as desired by the capacitor. This would provide an overall longer operating battery cell voltage to the load.

One great advantage resulting from the present invention is that charging the battery 10 would not require an external battery pack capacity or chemistry identification scheme to provide an appropriate charge to the battery. Since the current from the external power source (12) is regulated by the battery pack 10 (via the switching function means (9)) itself, such sensing for the identification or type of battery being charged would not be required to provide an appropriate charge and intrinsic safety. In other words, instead of having a "universal charger" as referred to in U.S. Pat. No. 4,006,396 by Bogut, the present invention introduces a "universal battery" which can be charged by conceivably any charger. The switching function means 9, thus provides an optimizing means for charging the cells (7) without using external battery capacity or chemistry sensing.

What is claimed is:

1. A rechargeable battery pack, comprising:
   at least one cell having a positive and a negative terminal;
   switching regulator circuitry coupled to said at least one cell for selectively regulating the battery output and regulating the charging of the battery pack, said switching regulator circuitry further comprising optimizing means for charging said at least one cell without external battery capacity identification sensing.

2. The rechargeable battery pack of claim 1, wherein said at least one cell consists of the group of nickel-cadmium, nickel hydride, mercury, lithium ion, zinc air, or lead acid.

3. The rechargeable battery pack of claim 1, wherein said switching regulator circuitry comprises at least one Supercapacitor.

4. The rechargeable battery pack of claim 1, wherein said optimizing means for charging said at least one cell is without chemistry identification sensing.

5. The rechargeable battery pack of claim 1, wherein said rechargeable battery pack resides within a housing having shielding means within said housing for reducing electromagnetic interference external to the housing.

6. The rechargeable battery pack of claim 1, wherein said cells are held within a housing having shielding means within said housing for reducing electromagnetic interference external to the housing.

7. The rechargeable battery pack of claim 1, wherein said cells are held within an absorbing means for converting electromagnetic energy into noninterfering energy and further serving as a battery housing.

8. A rechargeable battery pack for use with electronic products, comprising:
at least one cell having a positive and negative terminal;
switching regulator circuitry coupled to at least one said cell for providing both load regulation to a unit operated by said battery pack and recharging regulation to said battery pack, said switching regulator circuitry further comprises at least one supercapacitor.

9. A rechargeable battery pack, comprising:
a plurality of interconnected cells, each having positive and negative terminals;
switching regulator circuitry coupled to said cells for providing the dual function of energy load regulation to a unit operated by said battery pack and current regulation for recharging the battery pack, said switching regulator circuitry further comprising optimizing means for charging at least one cell of said plurality of interconnected cells without external battery capacity and chemistry identification sensing.

10. A rechargeable battery pack, comprising:
a housing serving as an absorbing means for converting electromagnetic energy into noninterfering energy;
at least one cell having a positive and a negative terminal within said housing;
switching regulator circuitry coupled to said at least one cell for providing the dual function of regulating the battery pack output and for regulating the charging of the battery pack;
shielding means within said housing for reducing electromagnetic interference external to the housing.

11. A rechargeable battery pack, comprising:
shielding means for reducing electromagnetic interference and further serving as a battery housing
a plurality of interconnected cells having positive and negative terminals within said housing;
switching regulator circuitry coupled to said cells for providing the dual function of current limited load regulation to a unit operated by the battery pack and current regulation for recharging the battery pack, said switching regulator circuitry further comprises at least one supercapacitor.

12. A rechargeable battery pack, comprising:
absorbing means for converting electromagnetic energy into noninterfering energy and further serving as a battery housing;
a plurality of interconnected cells having positive and negative terminals within said housing;
switching regulator circuitry coupled to said cells for providing the dual function of voltage load regulation to a unit operated by the battery pack and current regulation for recharging the battery pack.

13. A rechargeable battery pack, comprising:
a plurality of cells having positive and negative terminals;
switching regulator circuitry coupled to said cells for providing load regulation to a unit operated by said battery pack, recharging current regulation, and optimizing means for charging said cells without external battery capacity and chemistry identification sensing.

14. A rechargeable battery pack, comprising:
at least one cell having a positive and a negative terminal;
an energy storage device;
switching regulator circuitry for coupling said at least one cell to said energy storage device, for coupling an external power source to said energy storage device, and for further coupling said energy storage device to a load, said switching regulator circuitry further comprises at least one supercapacitor.

15. The rechargeable battery pack of claim 14, wherein said energy storage device comprises an inductor.

* * * * *